(12) United States Patent
Zhou et al.

(10) Patent No.: US 11,851,064 B2
(45) Date of Patent: Dec. 26, 2023

(54) VEHICLE DRIVE SYSTEM

(71) Applicant: KARMA AUTOMOTIVE LLC, Irvine, CA (US)

(72) Inventors: Lance Liang Zhou, Irvine, CA (US); Kevin Y. Zhang, Irvine, CA (US); Geng Niu, Irvine, CA (US)

(73) Assignee: Karma Automotive LLC, Irvine, CA (US)

( * ) Notice: Subject to any disclaimer, the term of this patent is extended or adjusted under 35 U.S.C. 154(b) by 248 days.

(21) Appl. No.: 17/392,021

(22) Filed: Aug. 2, 2021

(65) Prior Publication Data

US 2022/0032910 A1 Feb. 3, 2022

Related U.S. Application Data

(60) Provisional application No. 63/059,730, filed on Jul. 31, 2020.

(51) Int. Cl.
| | |
|---|---|
| *B60W 30/182* | (2020.01) |
| *B60K 7/00* | (2006.01) |
| *B60K 1/02* | (2006.01) |
| *B60W 30/18* | (2012.01) |
| *B60K 17/34* | (2006.01) |
| *B60L 15/20* | (2006.01) |
| *B60L 50/60* | (2019.01) |

(52) U.S. Cl.
CPC .............. *B60W 30/182* (2013.01); *B60K 1/02* (2013.01); *B60K 7/0007* (2013.01); *B60K 17/34* (2013.01); *B60L 15/20* (2013.01); *B60L 50/60* (2019.02); *B60W 30/1819* (2013.01)

(58) Field of Classification Search
CPC ........ B60K 17/34; B60K 1/02; B60K 7/0007; B60W 30/182
See application file for complete search history.

(56) References Cited

U.S. PATENT DOCUMENTS

| | | | |
|---|---|---|---|
| 5,921,338 A * | 7/1999 | Edmondson | B60K 20/04 280/124.111 |
| 10,821,816 B1 * | 11/2020 | Chow | B60K 1/04 |
| 11,007,880 B2 * | 5/2021 | Pianos | B60L 15/2009 |
| 2004/0074687 A1 * | 4/2004 | Mellot | B60L 1/003 903/902 |
| 2012/0175863 A1 * | 7/2012 | Theodore | B62D 21/04 29/469 |

(Continued)

FOREIGN PATENT DOCUMENTS

| | | |
|---|---|---|
| CN | 108394271 A | 8/2018 |
| JP | 2004-129390 A | 4/2004 |
| JP | 2018-103977 A | 7/2018 |

OTHER PUBLICATIONS

International Search Report and Written Opinion dated Nov. 8, 2021 issued by the International Searching Authority in related International Application No. PCT/US2021/044220; filed Aug. 2, 2021.

*Primary Examiner* — Brian L Swenson
(74) *Attorney, Agent, or Firm* — Honigman LLP

(57) ABSTRACT

A vehicle drive system for an electric vehicle having in-hub motors configured to be independently controlled from the main traction motors. The configuration allows for robust control of the vehicle dynamics and behavior by allowing an improved powertrain control. The system also allows the vehicle to achieve better efficiencies.

16 Claims, 3 Drawing Sheets

(56) References Cited

U.S. PATENT DOCUMENTS

| | | | |
|---|---|---|---|
| 2014/0343770 A1* | 11/2014 | Sponheimer | B60L 15/2036 |
| | | | 701/22 |
| 2017/0232848 A1 | 8/2017 | Lian et al. | |
| 2018/0201255 A1* | 7/2018 | Lian | B60K 17/34 |
| 2018/0209518 A1* | 7/2018 | Seki | B60K 7/0007 |
| 2020/0324649 A1* | 10/2020 | Gully | B60K 17/356 |
| 2020/0391748 A1* | 12/2020 | Bieniek | B60W 10/04 |
| 2022/0289044 A1* | 9/2022 | Downs, Jr. | B60L 50/60 |

* cited by examiner

VEHICLE DRIVE SYSTEM

This application claims priority to and the benefit of U.S. Provisional Patent Application No. 63/059,730 filed Jul. 31, 2020. The foregoing provisional application is incorporated by reference herein in its entirety.

GENERAL DESCRIPTION

The present disclosure relates to a drive system for a vehicle. Specifically, an electric vehicle drive train with a combined axle and in-hub drive systems for the wheels of the vehicle.

Electric vehicle usage is increasing as more countries employ mandates for the phasing out of fossil fuel vehicles. However, there is still a large demand for more efficient electric vehicles. More efficient electric vehicles allow for longer ranges and higher performance capabilities for the vehicles. Furthermore, while electric vehicles allow for more room than the fossil fuel counterparts, improvements can still be made in terms of drive train packaging. Thus, there is a need for improvements in vehicle performance and efficiency while maintaining or decreasing drive train packaging in order to provide increased cargo space and/or increased passenger compartment space.

The disclosed embodiments relate to a combined axle and in-hub drive system that provides an increased power train efficiency while minimizing drive train packaging.

BRIEF DESCRIPTION OF THE DRAWINGS

The features, aspects, and advantages of the present disclosure will become apparent from the following description, and the accompanying exemplary embodiments shown in the drawings, which are briefly described below.

DETAILED DESCRIPTION

According to a disclosed embodiment an electric vehicle is provided having first and second axles wherein each axle is coupled to a corresponding first and second wheel respectively. A transmission is coupled to a first and second traction motor. First and second in-hub motors are coupled to a corresponding third and fourth wheel respectively. The first and second traction motors and the first and second in-hub motors are preferably controlled by a combined system controller.

Figure 1:
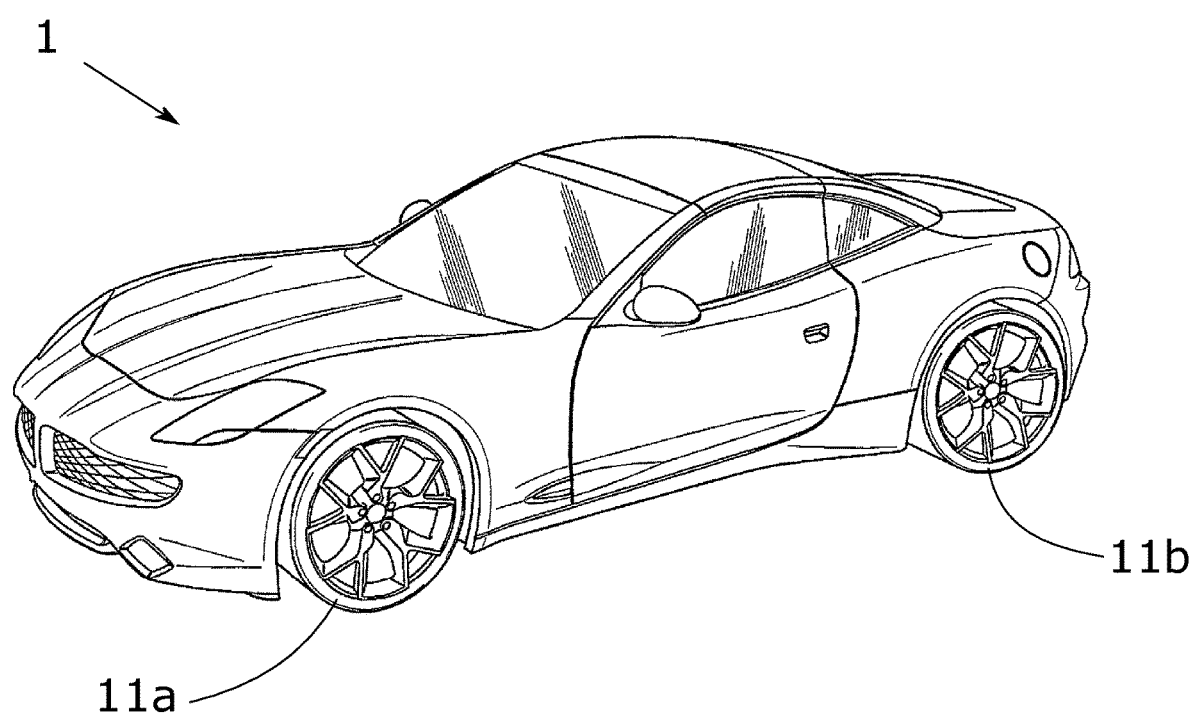
FIG. 1 is an exemplary vehicle with a combined drive system.

FIG. 1 illustrates a vehicle 1 having an electrical power train which may include one or more motors (not shown) driving the wheels 11a/b of the vehicle and a main propulsive battery (not shown) powering the motors of the vehicle 1.

Figure 2:
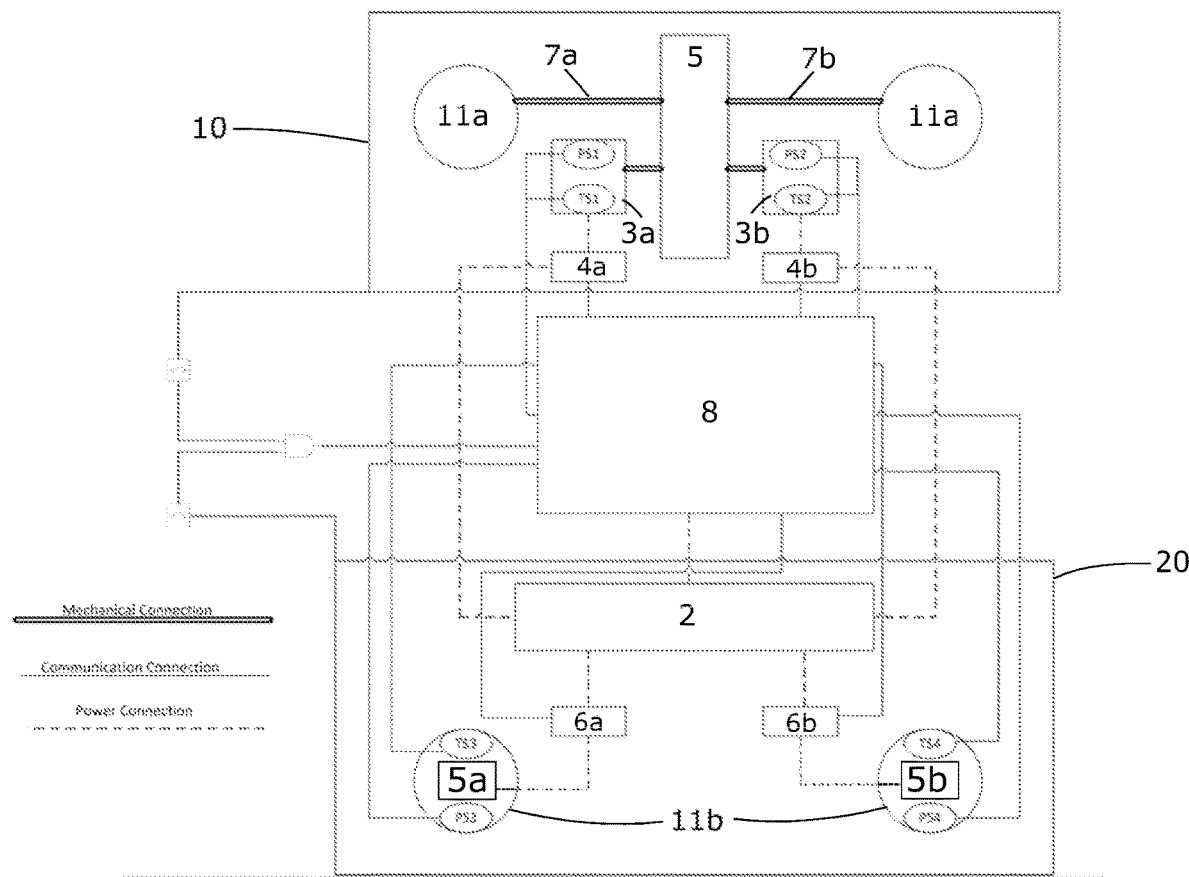
FIG. 2 is schematic of an exemplary combined drive system.

FIG. 2 illustrates a schematic of an exemplary powertrain of an electric vehicle having a combined drive system 100 including a first electric drive 10 and a second electric drive 20 and a battery 2 for providing propulsion power. The first electric drive may include front wheels 11a configured to be powered by a traction motors 3a and 3b. The traction motors 3a/b are mechanically connected to the wheels via a transmission 5. The transmission is configured to transfer power from the traction motors 3a/b to the axles 7a/b and thus the wheels 3a/b. The transmission may be configured as a typical gear type transmission used in electric vehicles. Inverters 4a and 4b are configured to convert DC power from the traction battery 2 to AC power for corresponding traction motors 3a/b. The status of the traction motors 3a/3b may be monitored by motor position sensors PS1 and PS2. Additional sensors such as motor temperature sensors TS1 and TS2 may also be provided and configured to monitor the temperature TS1, TS2 of the traction motors.

The second electric drive 20 may include rear wheels 11b, in-hub motors 5a and 5b, and inverters 6a and 6b configured to convert DC power from the traction battery 2 in AC power for the corresponding hub motors 5a and 5b. Motor position sensors PS3/PS4 and motor temperature sensors TS3/TS4 may also be located suitable to monitor the corresponding in-hub motors 5a and 5b. Solid lines connecting different components as shown in FIG. 2 represent a communication connection such as any wireless, wired, or waveguide manner. Dotted lines represent a power connection between the components connected.

A combined drive control system 8 is configured to communicate with and provide control or command signals to the components of the two electric drive systems 10 and 20. The control system 8 receives data signals from the inverters 4a/4b/6a/6b, position sensors PS1-PS4, and temperature sensors TS1-TS4. The combined drive control system 8 is configured to control the dynamics of the vehicle through the inverters 4a/4b/6a/6b.

Figure 3:
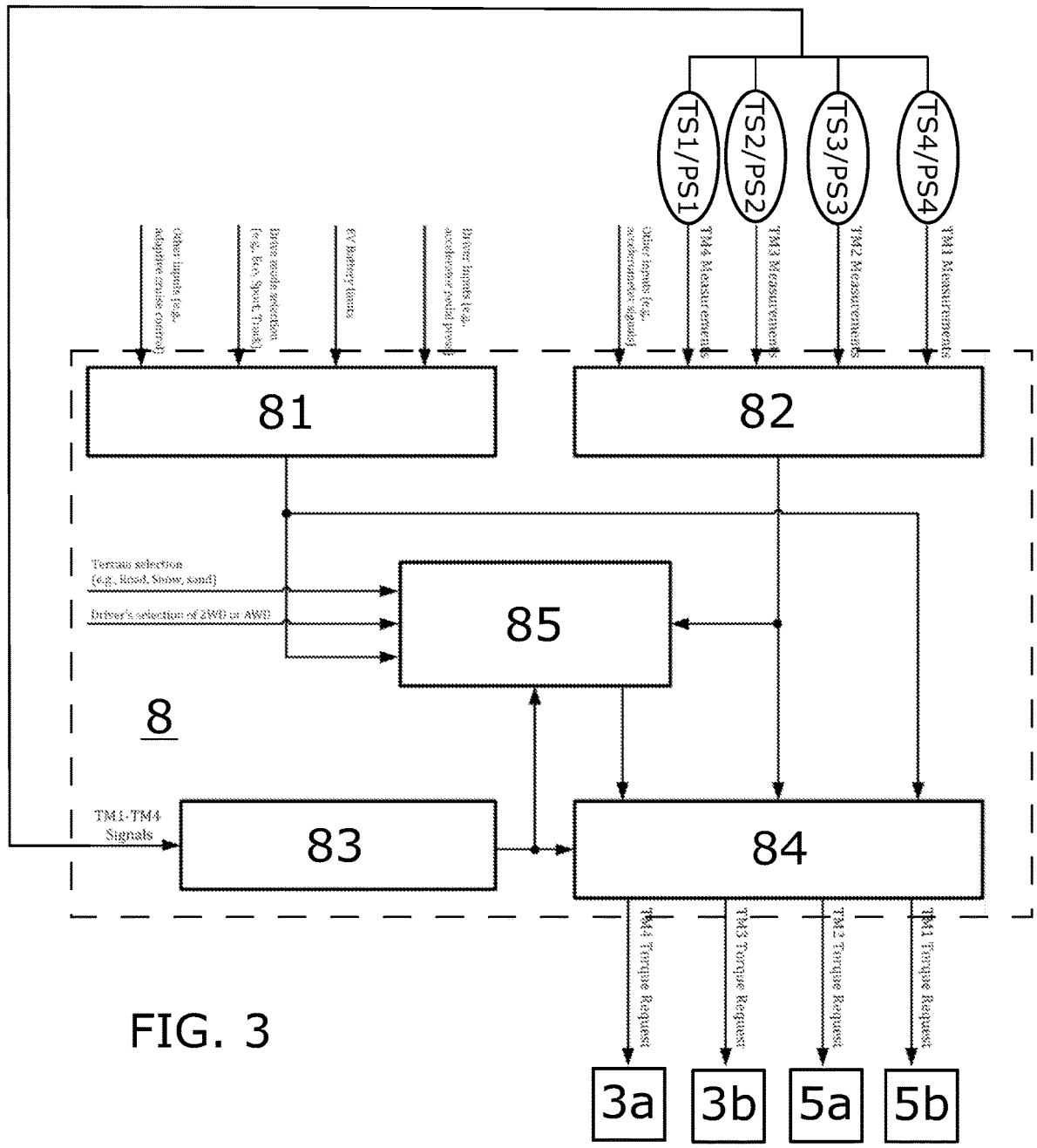
FIG. 3 is a control logic diagram of the combined drive system shown in FIG. 2.

FIG. 3 shows a control logic diagram of the combined drive system 100 shown in FIG. 2. The combine drive system operates by selectively activating the first and second electric drive systems depending on the conditions and the signal data received by the combined drive control system 8. The control logic diagram shown in FIG. 3 is carried out by the combined drive control system 8. The drive control system 8 may receive data carrying inputs from the positions sensors PS1-PS4, temperature sensors TS1-TS4, inverters 4a/4b/6a/6c. Other data inputs may include the adaptive cruise control system, vehicle drive mode selector, EV battery status, vehicle telemetry (e.g. throttle percentage), and any other sensors that may be utilized in a vehicle. TM1, TM2, TM3, and TM4 corresponds to any motor as noted in FIG. 2 (3a/3b/5a/5b)

The exemplary control logic shown in FIG. 3 is provided to allow the vehicle to be dynamically controlled. The vehicle handling and power characteristics may be efficiently and rapidly controlled via the drivetrain mode module 85 and torque request arbitration module 84. A total torque calculation module 81 of the combined control system 8 may be configured to dynamically calculate the output torque required based on the vehicle's status such as the vehicle operation mode (e.g. Eco/Sport/Track/Launch/etc.), EV battery status (e.g. battery charge percentage temperature, etc.), and telemetry (e.g. throttle percentage, brake percentage), and other sensors such as the adaptive cruise control system. The total torque calculation module 81 will then send the torque required to the torque request arbitration module 84 and the drivetrain mode module 85. If the total torque required by the vehicle is not able to be fulfilled by a single electric drive, either by utilizing drive system 10 or drive system 20 only, then all-wheel drive/4WD will be activated via the drivetrain mode module 85 and both drives 10/20 will operate. The torque request arbitration module 84 will then distribute a command signal to each active motor to provide the proper output torque (e.g. 5a/5b active for RWD, 4a/4b active for FWD, or 4a/4b/5a/5b active for AWD set by drivetrain mode module 85) of the vehicle in order to provide the correct vehicle power and handling.

For example, the combined drive control system 8 receives, as input, data signal from the vehicle a one of the following high-performance modes is activated: sport mode, launch control, track mode. If either of these modes are activated by the driver via the vehicle interface unit (not shown), the combined control system 8 will activate the first electric drive 10 and the second electric drive 20 in order to meet the high torque required set by calculation module 81. In another example, when the vehicle is set to a cruising mode or an eco mode (i.e., economy or energy conserving mode), the vehicle might not require full performance capabilities of all the motors. Thus, the total torque required may be provided by only the first drive 10. In one exemplary, the first drive system 10 (axle-drive system) will be utilized as the primary drive system. The first drive system 10 will typically be operating and providing propulsion. Thus, the second drive system 20 (in-hub motor system) will act as secondary, backup, or on-demand performance system providing additional propulsion and motors as necessary. The motor, transmission and propulsion system configuration described herein provides a system package that allows for better performance and efficiency while minimizing drive train packaging.

The combined drive control system 8 may also be configured to monitor vehicle and wheel traction via the traction monitoring and management module 82. The traction monitoring and management module 82 may be configured to monitor sensor data from each motor (e.g. from PS1-PS4 and TS1-TS4) and other positional sensors in the car (e.g. accelerometers). The traction monitoring and management system 82 allows the combined control system 8 to modify the drivetrain mode (2WD or AWD) in order to provide the best traction. If a wheel sensor (e.g. position sensor) acquires data that allows the controller to determine that a particular wheel is not gaining traction (e.g. sensor is reading much higher or faster than normal full traction conditions which is associated with a traction-less wheel) then the combined drive control system may provide a command signal to the corresponding motor associated with the wheel in order to gain traction for the wheel via the torque request arbitration module 84. The torque request arbitration module 84 controls the distribution of torque throughout the different motors depending on the drivetrain mode selected. The command signal may, for example, slow the motor down, thus slowing the wheel down, in order for the wheel to grip onto the surface before sending another command to speed the motor back up in order for the wheel to match the current vehicle telemetry and motion.

Another exemplary event where the combined drive control system may be utilized occurs when one of the two electric drives 10 or 20, is found inoperable or impaired via the fault detection module 83. The fault detection module 83 ensures that motors do not suffer from catastrophic failures. Sensors such as the temperature sensors TS1-TS4, may detect fault at one or more of the motors in the system. The fault detection module 83 of the combined drive control system 8 may receive high temperature data signals, for example, at TS1 and TS2 (i.e. motors 3*a*/3*b* are overheating). The fault detection module will then send command signals via the torque request arbitration module 84. The combined drive system may turn off the first electric drive 10 and only utilize the second electric drive 20.

The combined drive control system 8 may also activate electric drive 20 under braking conditions. For example, when additional braking required and the vehicle is in 2WD mode, the combined drive control system 8 may activate the electric drive 20 in order to provide additional braking force via regenerative braking or motor resistance. This braking assistance may be activated via other sensors such as collision sensors. During an emergency braking event, sensor data may be received by the total torque calculation module which will request the torque request arbitration module 84 and the drivetrain mode module 85 to request brake assistance from all motors available.

Thus, the combined control system 8 will allow the vehicle to run 2-wheel drive (2WD) or an all-wheel drive/4WD dynamically. The driver of the vehicle may also input road conditions such as (rain, snow, dirt, sand, etc.) which will force the vehicle into all-wheel drive as long as the road condition selector is set for the corresponding low traction terrain (rain, snow, dirt, sand, etc.). Each terrain may include different torque mapping for each motor in order to optimize traction on the terrain. The driver may also override the selection of 2WD or 4WD manually by using the vehicle interface.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the vehicle drive system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An electric vehicle comprising:
    a plurality of front wheels and a plurality of rear wheels wherein each rear wheel is driven by a corresponding hub motor, and wherein each corresponding hub motor is located within each rear wheel, wherein each front wheel of the plurality of front wheels is connected to a corresponding half-axle;
    a plurality of traction motors, wherein each of the traction motors provides power to one front wheel of the plurality of wheels via the corresponding half-axle;
    a main propulsive battery configured to provide power to the plurality of traction motors and each of the corresponding hub motors; and
    a combined drive control system configured to:
        receive input data signals, the input data signals including a signal representing a terrain selection received from a driver via a vehicle interface unit;
        control output torque of each traction motor independently based on the received input data signals; and
        control output torque of each hub motor independently based on the received input data signals.

2. The electric vehicle of claim 1, further comprising a transmission, wherein each of the plurality of traction motors is configured to provide power to one of the plurality of front wheels via the transmission.

3. The electric vehicle of claim 1, further comprising a plurality of inverters, wherein each inverter is configured to receive power from the battery and output power to each traction motor and each hub motor.

4. The electric vehicle of claim 3, wherein the combined drive control system is further configured to communicate and provide control signals to each inverter of the plurality of inverters.

5. The electric vehicle of claim 4, wherein each traction motor includes a traction motor temperature sensor in communication with the combined drive control system, and each traction motor further includes a traction motor position sensor in communication with the combined drive control system.

6. The electric vehicle of claim 5, wherein each hub motor includes a hub motor temperature sensor in communication with the combined drive control system, and each hub motor further includes a hub motor position sensor in communication with the combined drive control system.

7. The electric vehicle of claim 6 wherein the input data signals further include signals received from each traction motor temperature sensor, each traction motor position sensor, each hub motor temperature sensors, and each hub motor position sensors.

8. The electric vehicle of claim 7, wherein the combined drive control system is configured to selectively change the electric vehicle from a 2-wheel-drive vehicle to an all-wheel-drive vehicle by changing the output torque of each traction motor and each hub motor.

9. The electric vehicle of claim 7, wherein the input data signals further include a signal carrying data corresponding to at least one of a throttle pedal travel, a drive mode selection, and a state of charge of the propulsive battery.

10. A drive system for an electric vehicle, said drive system comprising:
    a transmission;
    a set of traction motors configured to power corresponding wheels of a first set of wheels of the electric vehicle through the transmission;
    a set of hub motors, wherein each hub motor is located within corresponding wheel of a second set of wheels of the electric vehicle, wherein each of the hub motors is configured to power the corresponding wheel of the second set of wheels;
    a combined drive control system configured to:
        control the set of traction motors and the set of hub motors; and
        selectively change the electric vehicle from a 2-wheel-drive vehicle to an all-wheel-drive vehicle by changing the output torque of each traction motor and hub motor.

11. The drive system of claim 10, wherein each traction motor includes a traction motor temperature sensor in communication with the combined drive control system, and each traction motor further includes a traction motor position sensor in communication with the combined drive control system.

12. The drive system of claim 11, wherein each hub motor includes a hub motor temperature sensor in communication with the combined drive control system, and each hub motor further includes a hub motor position sensor in communication with the combined drive control system.

13. The drive system of claim 12, wherein the combined drive control system is configured to control an output torque of each traction motor and is configured to control an output torque of each hub motor, wherein the output torque of each traction motor and the output torque of each hub motor depend on input data signals received by the combined drive control system.

14. The drive system of claim 13, wherein input data signals include signals received by each traction motor temperature sensor, each traction motor position sensor, each hub motor temperature sensors, and each hub motor position sensors.

15. The drive system of claim 14, wherein the input data signals further include signals received from a driver via a vehicle interface unit of the electric vehicle.

16. The drive system of claim 10, wherein the combined drive control system controls the set of traction motors and the set of hub motors via corresponding inverters, wherein one of the corresponding inverters is connected to the set of traction motors and another one of the corresponding inverters is connected to the set of hub motors.

* * * * *